United States Patent [19]

Sugiura

[11] 4,290,979

[45] Sep. 22, 1981

[54] AERATION APPARATUS

[76] Inventor: Eiichi Sugiura, 149, Matsumotocho, Hekinan-shi, Aichi-ken, Japan

[21] Appl. No.: 123,761

[22] Filed: Feb. 22, 1980

[30] Foreign Application Priority Data

Feb. 24, 1979 [JP]  Japan .................................. 54-21054

[51] Int. Cl.³ ............................................. B01F 3/04
[52] U.S. Cl. ....................................... 261/4; 209/170;
  210/221.2; 261/36 R; 261/64 B; 261/123;
  261/DIG. 75
[58] Field of Search ...................................... 261/4–6,
  261/36 R, 64 B, 123, 29, DIG. 75; 210/220, 221
  P; 209/169, 170

[56] References Cited

U.S. PATENT DOCUMENTS

| | | | |
|---|---|---|---|
| 2,483,426 | 10/1949 | Moore | 261/64 B |
| 3,662,890 | 5/1972 | Grimshaw | 261/DIG. 75 |
| 3,722,679 | 3/1973 | Logue | 261/DIG. 75 |
| 3,826,742 | 7/1974 | Kirk et al. | 261/DIG. 75 |
| 3,984,323 | 10/1976 | Evens | 261/DIG. 75 |
| 4,072,612 | 2/1978 | Daniel | 261/DIG. 75 |
| 4,139,579 | 2/1979 | Blum | 261/29 |
| 4,179,375 | 12/1979 | Smith | 261/DIG. 75 |

FOREIGN PATENT DOCUMENTS

2516371 10/1975 Fed. Rep. of Germany ... 261/DIG. 75

*Primary Examiner*—Richard L. Chiesa
*Attorney, Agent, or Firm*—Robert E. Burns; Emmanuel J. Lobato; Bruce L. Adams

[57] ABSTRACT

Apparatus for supplying air into a liquid can be used as an aeration apparatus for a biochemical waste water treatment system operating according to an activated sludge process, for example, or as an air bubble generator to be used in a solid particle flotation system. A liquid in a tank is circulated by a pump. An air intake device is disposed in a suction pipe connected to the pump. The air withdrawn by the air intake device is mixed and agitated with the liquid in the pump, whereby minute air bubbles are distributed throughout the liquid. The liquid containing air bubbles is fed from the pump to an injector disposed within the tank, and ejected thereby into the tank in the form of jet water streams.

5 Claims, 4 Drawing Figures

AERATION APPARATUS

FIELD OF THE INVENTION

The invention relates to an aeration apparatus, and more particularly, to an apparatus for injecting air into liquid which is used in the production of minute air bubbles in an oxygen supply and solid particle flotation system which may be used in a waste water treatment system according to activated sludge or aerobic aerated lagoon process.

In a waste water treatment system according to the activated sludge process, a continuous culture operation of a colony of mixed microorganisms is effected in the presence of dissolved oxygen using organic substances (BOD) contained in the waste water as a culture medium. The organic substances are oxidized and separated by sedimentation from a flock of microorganisms or an activated sludge which comprises the medium and mixed microorganisms. The aerobic aerated lagoon process operates based on a similar principle, but does not include a feedback of the activated sludge which occurs in the activated sludge process. Aeration comprises a very important factor in the biochemical treatment of the waste water in order to cause a dissolution of oxygen contained in the air into the waste water or to drive away or dissipate unnecessary gas or volatile material contained in the water. The aeration usually accompanies a mixing or agitation of the waste water. The supply of oxygen allows the biochemical reactions such as the oxidation of organic substances, the growth of microorganisms or self-oxidation by the activated sludge to proceed while the mixing and agitation enables a satisfactory suspension of the activated sludge for achieving an efficient contact between absorbed oxygen and the sludge. The aeration process takes place in a tank into which the waste water flows and to which the activated sludge is fed back. In the lagoon process, the aeration takes place in a lagoon in which the waste water dwells for a relatively long period of time. The rate of the biochemical reactions depends on the period of aeration, the quantity of microorganisms and organic materials, but such reactions proceed at a slow rate as compared with other chemical reactions. Accordingly, a treatment equipment of a larger size and an increased space for its installation are generally required. Nevertheless, the available space is limited in cities where such treatment equipment is to be installed. To minimize the area for provision of the treatment equipment, in particular, the aeration tank, it is necessary that the volume duty of the aeration tank be maximized. The volume duty $L_v$ is expressed as follows:

$$L_v = (QS_0/V)$$

Where V represents the volume of the aeration tank in m³, Q the flow rate of the incoming waste water in m³/day and $S_0$ the BOD concentration in the incoming waste water in mg/l.

The greatest technical difficulty encountered in a high duty process is to enhance the oxygen supply capability which assures a high rate of oxygen flow.

On the other hand, a flotation system for solid particles is a physical process of treating the waste water in which minute air bubbles are forcedly deposited on solid particles contained in a liquid to cause them to flow to the surface of the liquid together with the bubbles. Such a system is preferred for use in the treatment of waste water from industrial applications which include inorganic or toxic materials.

Description of the Prior Art

Aeration apparatus used in known biochemical waste water treatment systems can be categorized in the following three types:
 a. Air bubble type utilizing the injection of air into the waste water,
 b. A combined use of the air injection and a mechanical agitation by means of underwater turbine blades, and
 c. Surface agitation type.

With the air bubble and the combined use type, a displacement of oxygen occurs as the air bubbles are formed, as they float or when they are destructed, and the rate of displacement depends on the quantity of air supplied, the diameter of air bubbles, the air injection rate and the configuration of an aerator. In the surface agitation process, a displacement of oxygen occurs as agitating blades are rotated adjacent to the liquid level, location of occurrence being at the surface of thin films or drops of the liquid which is ejected into the atmosphere, at the points of impingement between the splashing liquid and the liquid surface, and at the surfaces of contact between the air and the liquid surface in a region of a negative pressure which is created behind the agitating blades. An aeration apparatus of the surface agitation type suffers the disadvantages that uniform mixing throughout the tank is difficult to achieve, and that the apparatus is unsuitable for use in cold places where the liquid surface may be frozen. While aeration apparatus of the air bubble type and the combined use type do not suffer from these disadvantages, the air bubble type requires the generation of minute air bubbles in order to enhance the oxygen flow efficiency. In this instance, there is a likelihood that an air outlet device, namely, an aerator, may be plugged by dusts contained in the air. To avoid this difficulty, it may be necessary to provide an air cleaner. In an aeration apparatus of the combined use type, turbine blades are disposed above an air outlet device in order to atomize air bubbles which are discharged from the device and to distribute them. However, if the quantity of air is increased, the agitation effect may be reduced since the turbine blades are surrounded by air bubbles. In the combined use type, power is required to operate both an air compressor and an agitator, resulting in increased operation cost.

Known aeration apparatus is limited in its oxygen supply capability. To overcome this difficulty, a pure oxygen aeration process has been proposed recently. This process is practiced with a closed and an open aeration tank, both of which are generally complex in arrangement, requiring an increased operating cost. In particular, there is a risk of explosion in the event hydrocarbon is mixed into the waste water.

SUMMARY OF THE INVENTION

The invention relates to an apparatus for injecting air into liquid, which apparatus is particularly preferred for use as an aeration apparatus used in a biochemical waste water treatment system. In addition, the apparatus can also be used as an air bubble generator which may be used in a physical waste water treatment system according to the solid particle flotation process.

It is an object of the invention to provide an air injection apparatus capable of producing a large quantity of minute air bubbles in a liquid without using a known aerator.

It is a specific object of the invention to provide an aeration apparatus which provides a high rate of displacement of oxygen from the air into a liquid and which enables a substantial improvement in the ratio of the oxygen absorbed to the quantity of the oxygen blown in.

It is another object of the invention to provide an aeration apparatus which is simple in construction, easy to maintain and requires a reduced operating cost.

In accordance with the invention, there is provided a compact aeration tank which achieves a reduced aeration period or a high volume duty. The invention is characterized by the provision of an air intake device which is disposed in a suction pipe connected to a pump that circulates a liquid in the tank. The air supplied by the intake device is strongly mixed and agitated with the liquid in the pump to distribute minute air bubbles throughout the liquid, which is then ejected in the form of a jet stream from an injector disposed within the tank. The air intake device is controlled to withdraw a quantity of air which corresponds to the discharge pressure of the pump.

Accordingly, the invention provides an apparatus which supplies air to a liquid in a tank. The apparatus comprises a pump connected to a drive source, a suction pipe for conducting the liquid from the tank to the pump, a discharge pipe for returning the liquid from the pump to the tank, an air intake device disposed in the suction pipe and including a body having an air passage which provides a communication between the interior of the suction pipe and the atmosphere, a valve disposed in the air passage, and a conduit connecting the valve with the discharge pipe, the size of the air passage being controlled in accordance with the discharge pressure of the pump, and an injector connected to the outlet end of the discharge pipe within the tank and including a housing which defines a doughnut-shaped annular passage, means for connecting the annular passage with the outlet end of the discharge pipe and a plurality of injection ports formed around the housing at suitable spacing. In a preferred embodiment of the invention, the pump used is of a centrifugal type. A preferred centrifugal pump is available from GEAR'S KOGYO K.K., Nishio-shi, Aichi-ken, Japan as NPH series.

DESCRIPTION OF THE PREFERRED EMBODIMENT

Figure 1:
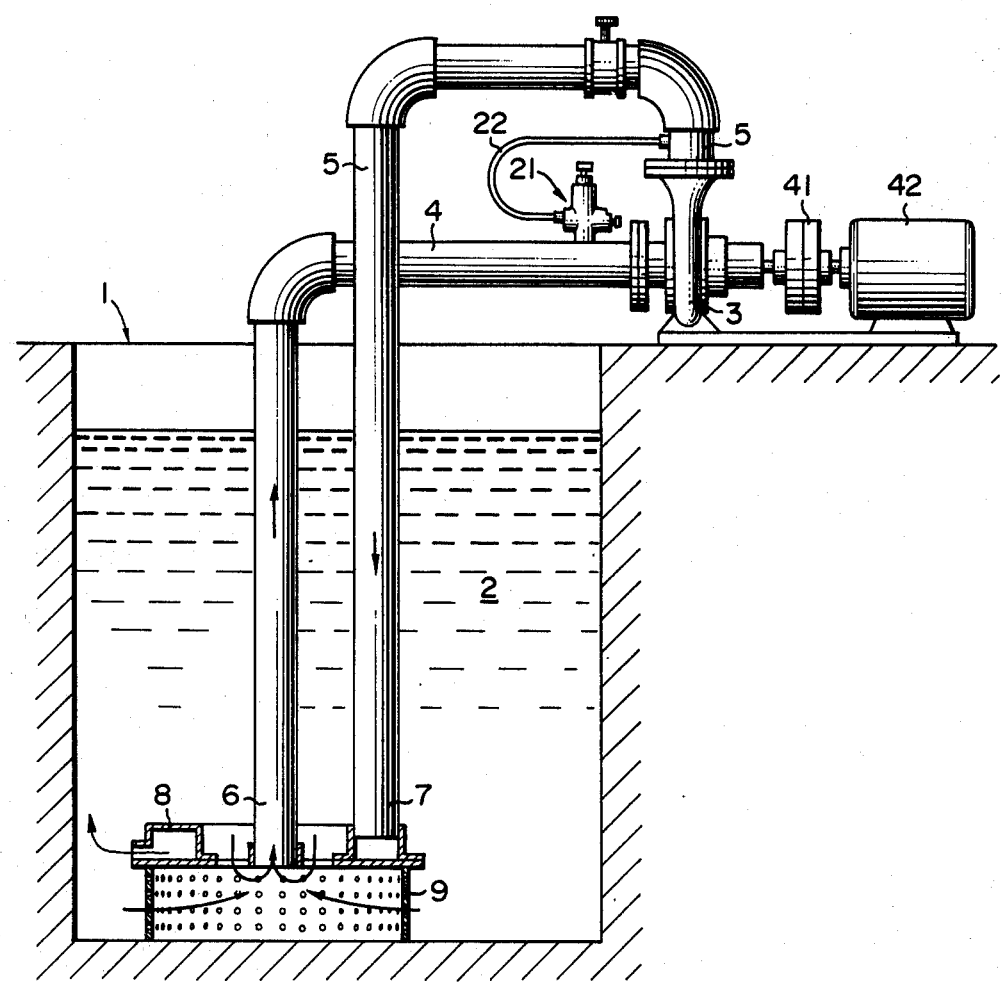
FIG. 1 is a side elevation, partly in section, of an aeration apparatus according to the invention.

Referring to FIG. 1, there is shown an air injection apparatus according to the invention which is used as an aeration apparatus in a biochemical waste water treatment system. For the convenience of the drawing, a tank 1 is shown in a reduced size, but it should be understood that it has a desired volume which is calculated according to the known design scheme. While not shown, the tank 1 is provided with an inlet port for the waste water and an inlet port for an activated sludge. The interior of the tank is filled with waste water 2 containing an activated sludge, which waste water will be hereafter referred to simply as "waste water".

Figure 3:
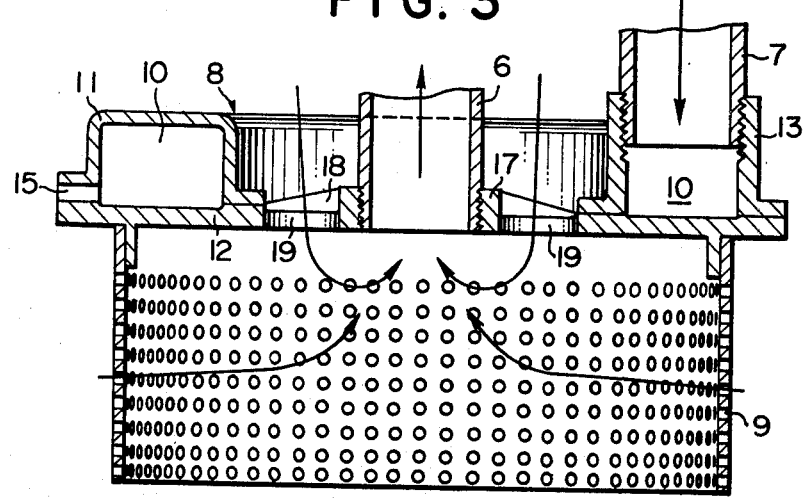
FIG. 3 is an enlarged cross section of a liquid injector shown in FIG. 1.
Figure 4:
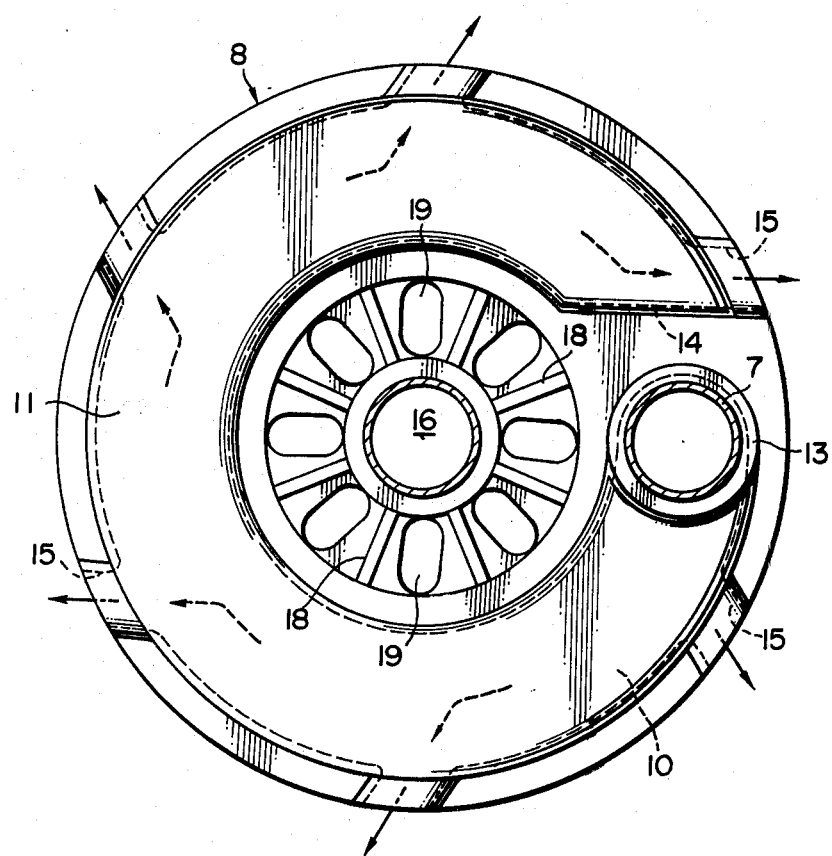
FIG. 4 is a plan view of the liquid injector shown in FIG. 3.

In accordance with the invention, the waste water 2 in the tank 1 is circulated by means of a pump 3, which is arranged externally of the tank 1 and connected thereto through a suction pipe 4 and a discharge pipe 5. The suction pipe 4 has an inlet end 6 which is provided with a strainer 9, which is in turn integrally joined with an injector 8 formed at the outlet end 7 of the discharge pipe 5. The strainer 9 comprises an apertured cylinder and is placed on the bottom of the tank 1. The injector 8 is disposed on top of the strainer 9, and includes a housing 11 defining a doughnut-shaped annular passage 10, as will be seen in FIGS. 3 and 4. The housing 11 is disposed on a bottomplate 12 which is secured to the top of the strainer 9. In order to connect the outlet end 7 of the discharge pipe 5 with the annular passage 10 of the injector 8, the housing 11 is formed with an interconnecting pipe section 13 which engages the discharge pipe 5. An end wall 14 of the annular passage 10 is located adjacent to the pipe section 13. A plurality of injection ports 15 which communicate with the annular passage 10 are formed in the outer wall of the housing 11. In the example shown, each port 15 is formed to extend horizontally at the location of the juncture between the housing 11 and the bottomplate 12, and has an equal angle of injection. However, it should be understood that any desired angle of injection can be chosen. The direction of injection can also be chosen at will. The direction of injection and the angle of injection can be determined so that liquids ejected from adjacent ports impinge against each other. The inlet end 6 of the suction pipe 4 communicates with the apertured, cylindrical strainer 9 through an opening 16 formed centrally in the circular bottomplate 12 of the injector 8. The opening 16 is surrounded by a cylindrical wall 17, around which a plurality of radially extending ribs 18 are provided, defining suction ports 19 therebetween.

Referring to FIG. 1, an air intake valve 21 is disposed in the suction pipe 4 to inject air into the waste water 2 being circulated by the pump 3, in accordance with the invention. Intake valve 21 include a pressure sensing pipe 22 which is connected to the discharge pipe 5 in order to control the quantity of air being withdrawn on the suction side in accordance with the discharge pressure of the pump 3.

Figure 2:
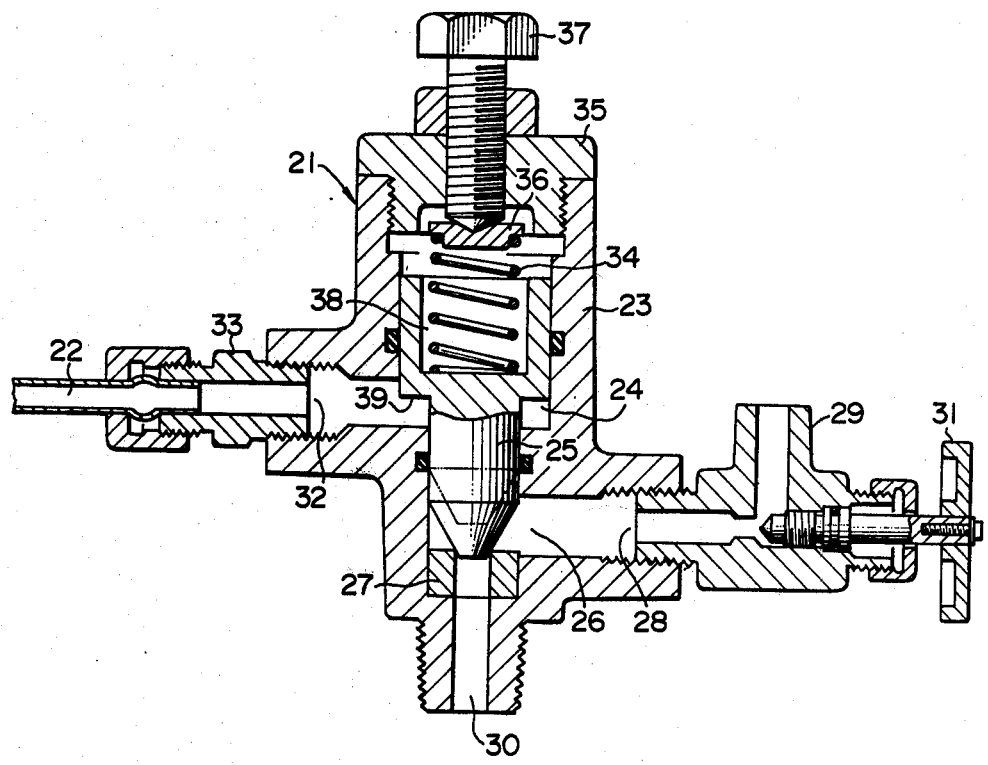
FIG. 2 is a cross section of an air intake valve shown in FIG. 1.

Referring to FIG. 2, the air intake valve 21 is shown in detail. It includes a body 23 which defines a cylinder chamber 24 in which a plunger 25 is fitted. One end of the plunger is located opposite to a valve seat 27 formed in an air passage 26 which is in turn formed in the body 23, thus controlling the air flow through the passage 26. The air passage 26 has an inlet end 28 which opens into the atmosphere through an air cock 29 while its output end 30 communicates with the suction pipe 4. The air cock 29 includes a handle 31, which may be operated to determine the cross sectional area of the air passage 26. One end of the cylinder chamber 24 communicates with a pressurized liquid passage 32 which is connected to the discharge pipe 5 through the pressure sensing pipe 22. A connector 33 is used to secure the pipe 22 to the body 23. The plunger 25 is urged by a spring 34 so that it normally closes the air passage 26. To mount the spring 34, the valve body 23 is provided with a valve cover 35 which is threadably engaged by an adjusting screw 37 carrying a spring abutment 36. One end of the spring 34 is received in an axial recess 38 formed in the plunger 25 while its other end bears against the spring abutment 36. The plunger 25 includes a shoulder portion 39 which is located within the cylinder chamber 24 and which is subject to the discharge pressure of the pump 3 that is introduced into the cylinder chamber 24 through the pressurized liquid passage 32, thus urging the plunger 25 against the resilience of the spring 34 in accordance with the discharge pressure. As a consequence, the plunger 35 determines the virtual cross sectional area of the air passage 26 which corresponds to the discharge pressure of the pump 3. It will be understood that the valve opening by the plunger 25 can be adjusted by the screw 37 which controls the degree of compression of the spring 34. It should be noted that the air intake valve shown is exemplary only, and may be replaced by any other known valve.

When the air passage 26 of the air intake valve 21 is opened, the air flows into the suction pipe 4 therethrough. During the operation of the pump 3, there will be developed a negative pressure in the outlet end 30 of the air passage 26, and hence the air can be withdrawn from the atmosphere through the inlet end thereof without requiring any ventilator. The air withdrawn into the suction pipe 4 together with the waste water will be strongly mixed and agitated with the waste water within the pump 3, thereby producing a large quantity of minute air bubbles in the waste water. The waste water containing such air bubbles will be fed through the discharge pipe 5 to the injector 8 located within the tank 1, which forcedly ejects it. The ejection achieves an overall mixing and agitation of the waste water 2 contained within the tank 1. It is desirable that the injection ports 15 of the injector 8 extend in the horizontal direction in order to increase the dwell time of the air bubbles within the tank 1.

The pump 3 is connected to an electric motor 42 through a coupling 41. In a preferred embodiment of the invention, a centrifugal pump is used. As is well recognized, the efficiency of a centrifugal pump is greatly reduced if the air is contained in the water being pumped, because the air expands near the impeller to block the inlets of the blades, causing a situation similar to cavitation to occur. However, it is also known that a certain centrifugal pump having an improved blading structure can be used with a liquid containing a large quantity of air without any practical difficulty. An example of such centrifugal pump is available from GEAR'S KOGYO K.K. as NPH series. The detail of the centifugal pump construction of this series is disclosed in Laid-Open German Pat. Application P 28 35 762 filed by the present inventor. Other types of the pumps can also be used.

In the aeration apparatus according to the invention, as the waste water and the air are mixed and agitated within the pump 3, the air is subjected to a strong shearing action at a high frequency by the blades of the pump, whereby it is converted into minute air bubbles. The waste water containing the bubbles continues to be mixed and agitated in the interior of the discharge pipe 5 and the injector 8 after its discharge from the pump 3. When it is injected as jet streams from the respective injection ports 15 of the injector 8, it causes a mixing and agitation of the overall liquid within the tank 1. In the process of such aeration, the partial pressure of oxygen in the air increases, so that the propulsion which expels oxygen in the air into the liquid increases, with result that the oxygen absorption relative to the quantity of oxygen injected, or the oxygen absorption efficiency, is greatly improved. Consequently, the aeration period required can be reduced or a compact aeration tank having a high volume duty can be designed.

While a particular embodiment of the invention has been described in detail which is applied to the aeration in a waste water treatment system according to the activated sludge process, it should be understood that the apparatus of the invention can equally be used as an aeration apparatus for an aerobic aerated lagoon. Also, it will be readily apparent that the invention can also be used as an air bubble generator for a solid particle flotation system.

What is claimed is:

1. An apparatus for supplying air to a liquid within a tank, comprising:

a pump connected to a drive source;

a suction pipe for feeding a liquid from the tank to the pump;

a discharge pipe for returning the liquid from the pump to the tank;

an air intake device disposed in the suction pipe and including a body having an air passage which provides a communication between the interior of the suction pipe and the atmosphere, a valve disposed in the air passage, and means including a conduit connecting the valve with the discharge pipe intermediate its ends for controlling the size of the air passage in accordance with the discharge pressure of the pump; and an injector disposed within the tank and connected to the outlet end of the discharge pipe and including a housing which defines an annular passage, means for connecting the outlet end of the discharge pipe to the annular passage, and a plurality of injection ports spaced apart around the housing and communicating with the annular passage.

2. An apparatus according to claim 1 in which the tank is provided with an inlet port for a waste water containing organic substances and an inlet port for an activated sludge, and in which the pump is operable to effect a mixing and agitation of the air withdrawn by the air intake device with the waste water and the activated sludge.

3. An apparatus according to claim 1 in which the injection ports of the injector open in the horizontal direction.

4. An apparatus according to claim 1 in which the inlet end of the suction pipe is provided with a strainer, which is disposed below the injector.

5. An apparatus according to claim 4 in which the strainer comprises an apertured cylindrical member and is disposed in coaxial relationship with the injector and wherein the inlet end of the suction pipe communicates with the strainer through an opening centrally formed in the injector.

* * * * *